United States Patent [19]
Farkas et al.

[11] Patent Number: 5,905,349
[45] Date of Patent: May 18, 1999

[54] METHOD OF CONTROLLING ELECTRIC MOTOR TORQUE IN AN ELECTRIC VEHICLE

[75] Inventors: Kenneth James Farkas, Dearborn; Mukunda V. Prema, Canton; Jack H. Xu, Troy, all of Mich.

[73] Assignee: Ford Motor Company, Dearborn, Mich.

[21] Appl. No.: 09/064,237

[22] Filed: Apr. 23, 1998

[51] Int. Cl.[6] .................................................. B60L 15/20
[52] U.S. Cl. ............................................ 318/432; 318/139
[58] Field of Search ................................. 318/139, 432, 318/433, 434; 180/170, 282

[56] References Cited

U.S. PATENT DOCUMENTS

| | | |
|---|---|---|
| 3,882,950 | 5/1975 | Strohlein . |
| 4,691,148 | 9/1987 | Nicholls et al. . |
| 5,234,071 | 8/1993 | Kajiwara . |
| 5,287,772 | 2/1994 | Aoki et al. . |
| 5,293,316 | 3/1994 | Slicker ................................. 364/424.1 |
| 5,376,869 | 12/1994 | Konrad . |
| 5,446,351 | 8/1995 | Kusano et al. ........................... 318/139 |
| 5,457,363 | 10/1995 | Yoshii et al. . |
| 5,476,310 | 12/1995 | Ohtsu et al. . |

FOREIGN PATENT DOCUMENTS 9-37415 7/1995 Japan .

*Primary Examiner*—Bentsu Ro
*Attorney, Agent, or Firm*—Gregory P. Brown; Roger L. May

[57] ABSTRACT

A method of controlling electric motor torque in an electric vehicle for improved vehicle performance and energy conservation includes receiving a throttle torque request and a brake torque request, and sensing the speed of the vehicle. The brake torque request is split into a creep cancellation component and a brake regenerative component. The throttle torque request is adjusted based upon the creep cancellation component and the brake regenerative component to produce a torque sum. The electric motor torque is then controlled based upon the torque sum.

7 Claims, 2 Drawing Sheets

METHOD OF CONTROLLING ELECTRIC MOTOR TORQUE IN AN ELECTRIC VEHICLE

TECHNICAL FIELD

The present invention relates to a method of controlling electric motor torque in an electric vehicle, and more particularly to a method of using the brake signal on an electric vehicle powertrain to provide both regenerative, or negative, braking torque at relatively higher speeds and creep forward torque cancellation at relatively lower speeds.

BACKGROUND OF THE INVENTION

On a typical internal combustion engine vehicle, a significant amount of energy is wasted as the engine generates creep torque when the brakes are applied in the 0 to 6 mph range, and a significant amount of kinetic energy is lost in higher vehicle speed ranges when the brake is applied but the engine continues to burn fuel. However, on an electric vehicle, where energy conservation is extremely important to maximize vehicle driving range, it is highly desirable to provide a method of controlling electric motor torque in the vehicle to improve vehicle performance and energy conservation, particularly in the creep torque range and high speed braking range.

For purposes of this disclosure, it is important to understand electric vehicle related terminology. "Brake regen" is a term referring to the creation of regenerative torque, as a function of the brake signal input, which opposes the direction of vehicle travel, causing the motor to produce a regenerative current into the electric vehicle battery. The torque produced aids the mechanical brakes in reducing the vehicle speed. In other words, when the brakes are applied at a high vehicle speed, the negative torque generates a current to the battery which recharges the battery and assists in slowing the vehicle by slowing the motor.

"Compression regen" is a term which refers to the creation of regenerative torque, as a function of vehicle speed and accelerator pedal position, which opposes the direction of vehicle travel, causing the motor to produce a regenerative current into the electric vehicle battery. The amount of torque produced is set to emulate the engine compression drag feel of an internal combustion engine vehicle.

"Creep torque" is a term which refers to the creation of motor torque under zero accelerator depression which causes the vehicle to move forward when the vehicle is at lower speeds, typically between 0 to 6 mph. The amount of torque produced is set to emulate the creep forward driving feel of an internal combustion engine vehicle.

Accordingly, it is desirable to provide a method of controlling electric motor torque in an electric vehicle in which both regenerative (negative) torque is produced at higher speeds during braking and "creep" (forward) torque cancellation is provided at lower speeds.

DISCLOSURE OF INVENTION

The present invention achieves both brake regen and creep cancellation by using brake pedal input to command the motor to produce regenerative torque at higher speeds to recover the vehicle's kinetic energy, and to reduce the amount of vehicle "creep" torque, while in the creep torque speed range, in order to reduce the amount of wasted energy. The method also smoothly but quickly stops creep cancellation if canceling creep torque causes the vehicle to roll backward on an uphill incline.

More specifically, the present invention provides a method of controlling electric motor torque in an electric vehicle for improved vehicle performance and energy conservation, which includes receiving a throttle torque request and a brake torque request, and sensing the speed of the vehicle. The brake torque request is split into a creep cancellation component and a brake regenerative component. The throttle torque request is then adjusted based upon the creep cancellation component and the brake regenerative component to produce a torque sum. The electric motor torque is then controlled based upon the torque sum.

Preferably, the step of splitting the brake torque request includes multiplying the brake torque request by a splitting factor generated by a splitter map based upon vehicle speed, thereby producing the brake regenerative component. The absolute value of the brake regenerative component is subtracted from the brake torque request to produce a first creep cancel signal. The first creep cancel signal is multiplied by a gain factor to produce a second creep cancel signal. The creep torque portion of a throttle torque command is determined, and the lesser of the creep torque portion and the second creep cancel signal is selected to produce the creep cancellation component, thereby assuring that the creep cancellation component only cancels creep torque.

Accordingly, an object of the present invention is to provide a method of using the brake signal on an electric vehicle powertrain to provide both regenerative, or negative, braking torque at relatively higher speeds and creep forward torque cancellation at relatively lower speeds.

The above object and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

The present invention provides a method of using brake pedal input to command the electric motor of an electric vehicle to produce regenerative torque at higher speeds to recover the vehicle's kinetic energy, and to reduce the amount of vehicle creep torque, while in the creep torque speed range, in order to reduce the amount of wasted energy. The control system smoothly determines whether the brake pedal input should be used for either of the two purposes stated, and if so, smoothly sums together the brake torque request with the throttle torque request.

Figure 1:
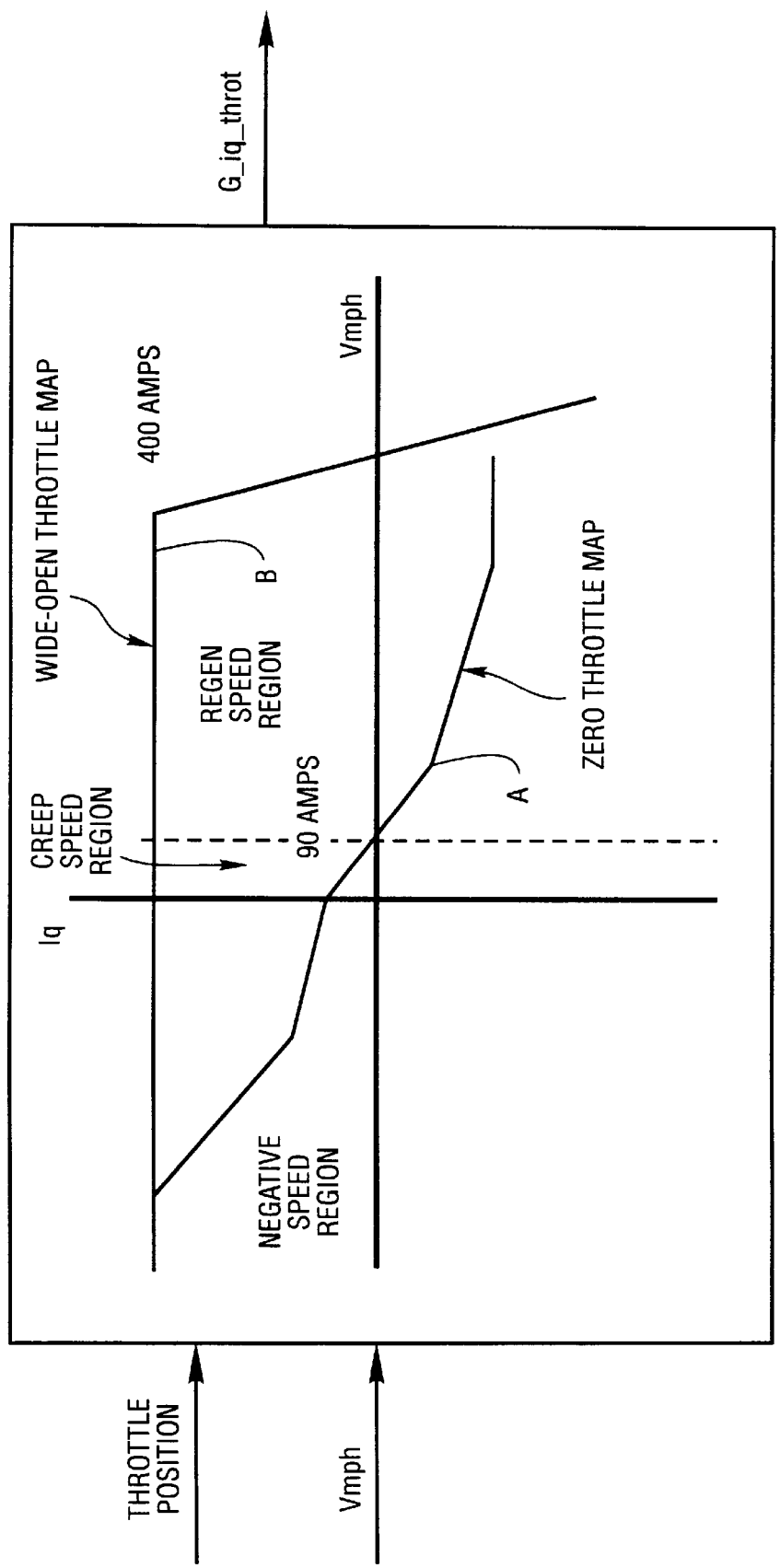
FIG. 1 shows a throttle torque request map in accordance with the present invention.

It is important to understand various vehicle scenarios to aid in determining how the brake should modify the overall motor torque request. A throttle torque request map is shown in FIG. 1. Over the entire vehicle speed range, both a zero throttle curve A and a wide open throttle curve B are shown. The horizontal axis is vehicle speed ($V_{mph}$) and the vertical axis is a current ($I_q$), which is representative of torque. The throttle position, determined by the driver of the vehicle, is used to interpolate between the zero throttle curve A and the wide open throttle curve B to determine the throttle torque request. Note that in FIG. 1 there is a creep speed region between the point at which the zero throttle curve A crosses the vertical and horizontal axes, a regen speed region to the right of the point at which the zero throttle curve A crosses the horizontal axis, and a negative speed region to the left of the vertical axis. These regions, and the throttle torque request, are referred to in the following descriptions:

A. Creep Speed Region

The creep speed region is the region between approximately 0 and 6 mph. This region appears in FIG. 1 between the points at which the zero throttle curve A crosses the vertical and horizontal axes. When in this speed region, we do not want the brake torque to create an overall negative, or regenerative, torque request. We only want the brake to cancel the creep portion of the throttle torque request. In the event both brake and throttle are being depressed, we again only want the brake torque to cancel the creep portion of the throttle request; we do not want the brake torque to completely override the throttle torque request. As the amount of creep torque changes, the amount of brake torque used to cancel this creep torque must also change.

B. Regen Speed Region

The regen speed region is shown in FIG. 1 to the right of the point at which the zero throttle curve A crosses the horizontal axis. As the speed of the vehicle increases away from the creep speed region and into the regen speed region, we are no longer interested in using the brake to cancel the creep torque (there is no creep torque, but there may be compression regen torque). We now want the brake pedal to contribute brake regenerative current, or negative torque, to the overall torque request. A smooth method is described herein to bring in, or out, this additional brake regen torque.

C. Negative Speed Region

Referring to FIG. 1, the negative speed region occurs to the left of the vertical axis. As stated above, in the creep speed region, the brake torque is used to cancel the creep torque. If a vehicle is on an upward slope, canceling the creep torque may cause the vehicle to begin to roll backward. A method is provided herein to sense this situation and recover by not causing the brake torque to cancel the creep torque, helping to stop the vehicle from rolling backward. The control system smoothly transitions from canceling creep to not canceling creep. If the vehicle continues rolling backward (on a steep hill), or was at a negative speed intentionally, depressing the brake should cause the brake torque to be applied in the forward direction, further assisting the mechanical brakes to stop the vehicle from rolling backward.

In addition, if the vehicle is on an upward sloping hill at zero speed with both the brake and throttle depressed, there should be a positive torque at the wheel shaft. Again, the brake torque should not completely cancel the throttle torque. Therefore, when the brake pedal is released, causing the mechanical brakes to release, the vehicle will begin to move forward due to the positive torque at the wheel shaft. If the control system was designed to have the brake torque completely cancel the throttle torque, in the same scenario, releasing the brake would cause the vehicle to roll backward for a short period of time (the time in which the mechanical brakes released and the positive torque begins to ramp up) before accelerating forward.

Figure 2:
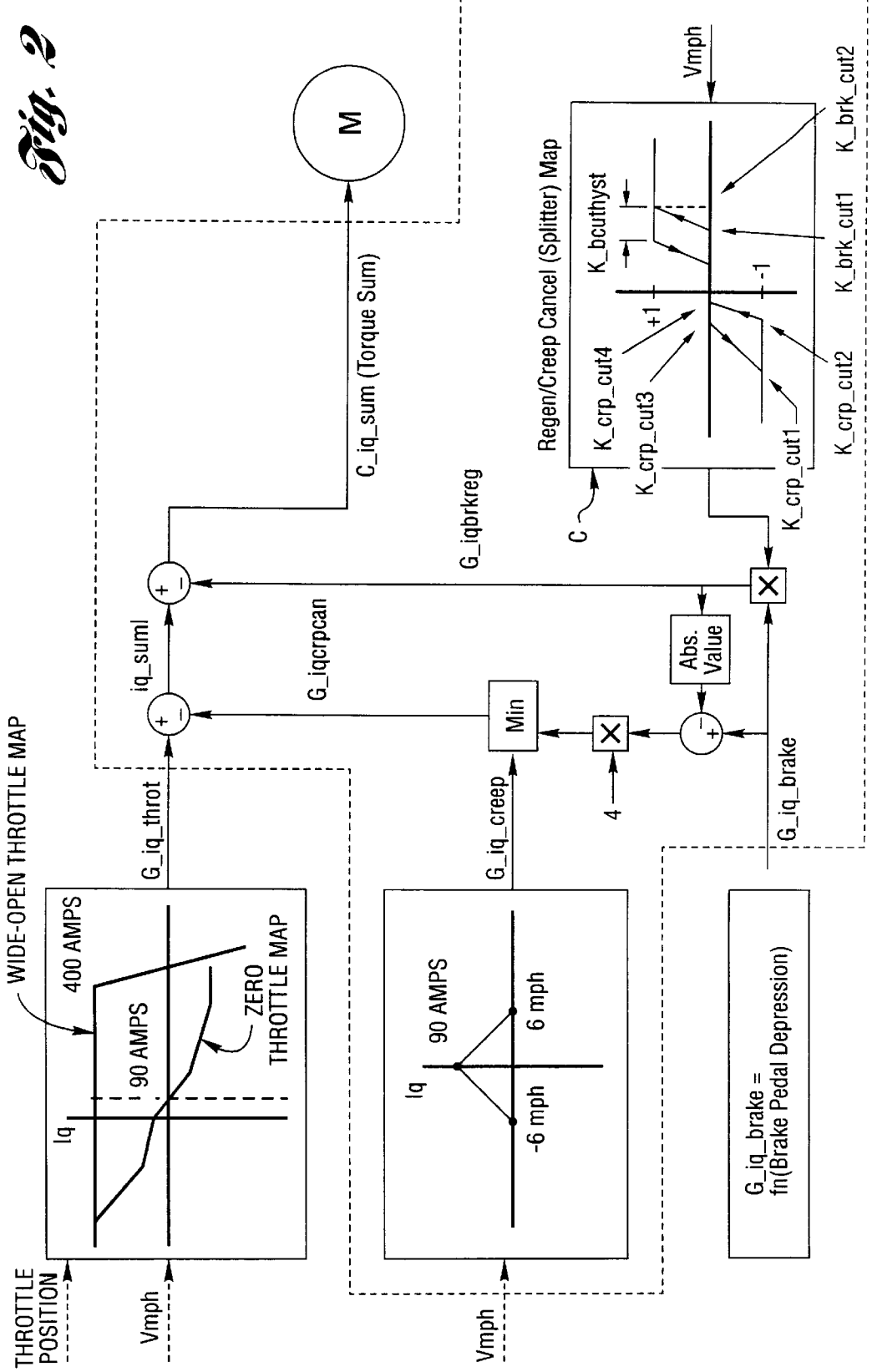
FIG. 2 shows a flow diagram of a method of using the electric motor torque for both brake regen and creep cancellation in accordance with the present invention.

The method of using the electric motor torque for both brake regen and creep cancellation are described using the block diagram shown in FIG. 2. The inputs to this block diagram are: a) $V_{mph}$—the vehicle speed in miles per hour; b) G_IQ_THROT—the throttle torque command, which is a function of throttle position and vehicle speed; and c) G_IQ_BRAKE—the brake torque command, which is a function of brake pedal position. The output of this diagram is G_IQ_SUM, the overall torque command based on vehicle speed, and both the throttle and brake torque commands. The major element of this method is contained within the regen/creep cancel map C.

The output of the regen/creep cancel map C, which is termed the "splitting factor", is multiplied by the brake torque command, G_IQ_BRAKE. The resulting portion, G_IQBRKREG, is termed the "brake regenerative component", and is used for brake regenerative purposes. The unused portion of G_IQ_BRAKE, or G_IQ_BRAKE minus the absolute value of G_IQBRKREG, is termed the "first creep cancel signal" and is used for brake creep cancellation purposes. This provides for smooth transitions between using brake torque for creep cancellation versus regen.

The first creep cancel signal is further modified by multiplying by a gain of 4 to allow the brake to quickly cancel the creep torque, producing the second creep cancel signal. The resulting value is then clamped or capped to the creep torque portion of the throttle torque command, G_IQ_CREEP, assuring that the brake portion used for creep cancellation only cancels the creep torque. The G_IQ_CREEP signal is termed the "creep torque portion" of the throttle torque command. The lesser of the creep torque portion and the second creep cancel signal is selected in order to produce the creep cancellation component, labeled G_IQCRPCAN in FIG. 2. This amount is then subtracted from the throttle torque request, G_IQ_THROT, resulting in the creep adjusted torque, labeled IQ_SUM1 in FIG. 2.

The creep adjusted torque, IQ_SUM1, is then adjusted by subtracting the brake regenerative component, labeled G_IQBRKREG in FIG. 2, thus resulting in the torque sum, labeled G_IQ_SUM.

The torque sum, G_IQ_SUM, is then used to control the electric motor torque in the motor M.

The regen/creep cancel map C shown in FIG. 2 contains many calibrations (identified in FIG. 2 as K_ . . . ) which allow it to be tuned to provide proper vehicle feel and operation. In transitioning from the creep region to the regen speed region, the output of this map is ramped from 0 to 1, causing the brake torque command to be utilized for regen purposes, as opposed to creep cancellation. Transitioning from the regen speed region to the creep speed region creates an opposite effect, as desired. Furthermore, if the vehicle begins to roll backward (i.e. transitions to the negative speed region), the output of this map C is ramped from 0 to −1. This causes the creep cancellation component to be reduced (which is also supported by clamping or capping to the creep torque portion G_IQ_CREEP), and causes the brake regen portion to have an additive effect on the overall torque sum, G_IQ_SUM. This causes the brake to have a positive effect on keeping the vehicle from rolling backward, and actually assists the mechanical brakes in doing so. Hysteresis is used in both curves on this map to prevent the transitioning from creating vehicle oscillations.

This method has been applied to the control system of an electric vehicle, and has proven to be successful in both driver feel and electrical operation, on both flat surfaces and various inclines.

While the best mode for carrying out the invention has been described in detail, those familiar with the art to which this invention relates will recognize various alternative designs and embodiments for practicing the invention within the scope of the appended claims.

What is claimed is:

1. A method of controlling electric motor torque in an electric vehicle for improved vehicle performance and energy conservation, the method comprising:

receiving a throttle torque request;

receiving a brake torque request;

sensing the speed of the vehicle;

splitting the brake torque request into a creep cancellation component and a brake regenerative component;

adjusting the throttle torque request based upon the creep cancellation component and the brake regenerative component to produce a torque sum; and controlling the electric motor torque based upon the torque sum.

2. The method of claim 1, wherein said step of splitting the brake torque request comprises multiplying the brake torque request by a splitting factor generated by a splitter map based upon vehicle speed, thereby producing the brake regenerative component.

3. The method of claim 2, wherein said step of splitting the brake torque request further comprises:

subtracting an absolute value of the brake regenerative component from the brake torque request to produce a first creep cancel signal;

multiplying the first creep cancel signal by a gain factor to produce a second creep cancel signal;

determining a creep torque portion of a throttle torque command; and selecting the lesser of the creep torque portion and the second creep cancel signal to produce the creep cancellation component, thereby assuring that the creep cancellation component only cancels creep torque.

4. The method of claim 1, wherein said step of adjusting the throttle torque request comprises:

subtracting the creep cancellation component from the throttle torque request to produce a creep-adjusted torque; and subtracting the brake regenerative component from the creep-adjusted torque to produce the torque sum.

5. The method of claim 2, wherein said step of multiplying the brake torque request by a splitting factor generated by a splitter map comprises selecting a splitting factor between 1 and −1 from a splitter map based upon a map curve having positive and negative calibrated hysteresis portions.

6. A method of controlling electric motor torque in an electric vehicle for improved vehicle performance and energy conservation, the method comprising:

receiving a throttle torque request;

receiving a brake torque request;

sensing the speed of the vehicle;

splitting the brake torque request into a creep cancellation component and a brake regenerative component by multiplying the brake torque request by a splitting factor generated by a splitter map based upon vehicle speed, thereby producing the brake regenerative component;

adjusting the throttle torque request based upon the creep cancellation component and the brake regenerative component to produce a torque sum; and controlling the electric motor torque based upon the torque sum.

7. A method of controlling electric motor torque in an electric vehicle for improved vehicle performance and energy conservation, the method comprising:

receiving a throttle torque request;

receiving a brake torque request;

sensing the speed of the vehicle;

splitting the brake torque request into a creep cancellation component and a brake regenerative component;

subtracting the creep cancellation component from the throttle torque request to produce a creep-adjusted torque;

subtracting the brake regenerative component from the creep-adjusted torque to produce a torque sum; and controlling the electric motor torque based upon the torque sum.

* * * * *